Sept. 20, 1927. 1,642,728
L. McK. GLEN
PIPE COUPLING MEANS FOR MAKING STEAM AND OTHER FLUID TIGHT JOINTS
Filed Aug. 1, 1925

Witness:   Inventor:
Arthur Thompson   Lauchlan McKennon Glen

Patented Sept. 20, 1927.

1,642,728

UNITED STATES PATENT OFFICE.

LAUCHLAN McKINNON GLEN, OF JOHANNESBURG, TRANSVAAL, SOUTH AFRICA, ASSIGNOR OF ONE-HALF TO CHARLES ROBERT MacGILLIVRAY, OF JOHANNESBURG, SOUTH AFRICA.

PIPE-COUPLING MEANS FOR MAKING STEAM AND OTHER FLUID TIGHT JOINTS.

Application filed August 1, 1925, Serial No. 47,589, and in the Union of South Africa September 23, 1924.

This invention relates to pipe coupling means, for making steam and other fluid-tight joints, and is particularly applicable for connecting together the ends of the steam pipes used for heating and other purposes in railway passenger coaches and other railway vehicles. It can be utilized for making similar couplings or connections where duplicate pipe coupling or connecting members are at present provided, as is the case with the ends of railway vehicles provided with the ordinary male and female steam coupling members. The invention can also be employed for connecting the ends of the pipes used for conveying compressed air for actuating brakes on railway and like vehicles.

The object of the invention is to construct a steam or like pipe coupling which will obviate the necessity for duplicating the coupling members and provide, at each end of the vehicle, a part or element incorporating both male and female members.

The invention will be particularly described in connection with the accompanying drawings, wherein, Fig. 1 is a side elevation, in full lines, of one part, element or half of the coupling, showing, in dotted lines, the other part, element or half of the coupling in operative relation thereto.

Figure 1:
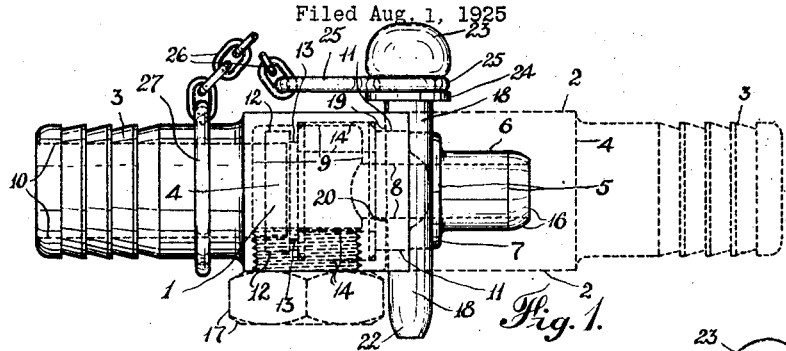
Figure 2:
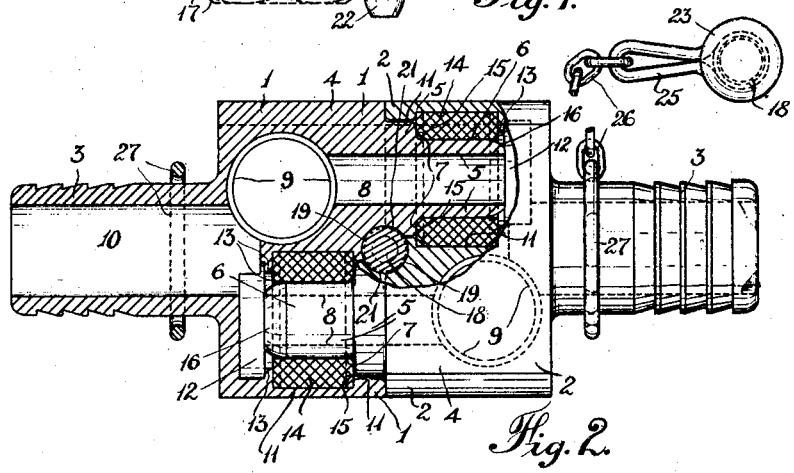
Fig. 2 is a part-sectional plan of the two parts, elements or halves of the coupling in the coupled position.
Figure 3:
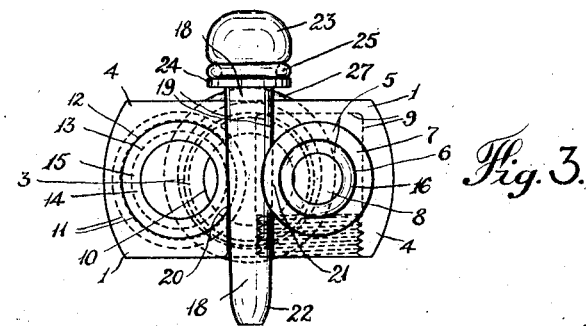
Fig. 3 is an end elevation of Fig. 1.

Referring more particularly to the embodiment of the invention depicted in Figs. 1 to 3 of the drawings, the coupling comprises two exactly similar parts, elements or halves 1, 2. One part or half of such coupling is provided at each end of each vehicle, so that when the vehicles are brought together to be connected, the coupling parts or halves can be brought together or caused to engage to make the requisite joint in the steam pipe. As each of the two parts, elements or halves 1, 2, of the coupling is identical with the other, it will suffice to describe one of them.

The part or half 1 includes a tubular portion or hollow stem 3, constructed for connecting it, say by suitable flexible means—not shown—with the flexible end of the steam pipe—also not shown. This stem or tubular member is fashioned with a head or enlarged portion 4 which is constructed at or near the one side with a nipple or hollow projection 5, the outer portion of which is reduced, as indicated at 6, to form an annular shoulder 7. The nipple 5 is in communication through the passage 8 and recess 9 in the head 4, with the bore 10 of the stem 3. At or near the other side the head 4 is constructed with a hole 11 which is also in communication, through recess 12, with the bore 10 of the tubular stem 3; 13 being an annular internal projection between the hole 11 and recess 12. In the hole 11 a rubber or other suitable resilient hollow cylindrical packing 14 is arranged which, at its outer end, forms a shoulder 15 against which the shoulder 7 on the nipple 5 of the other part, element or half 2 of the coupling contacts when the nipple 5 of said other part element or half 2 is projected into or caused to enter the hole 11 and said packing 14, which latter it closely fits. When the halves are brought together the nipple 5 of the part 1 enters the hole 11 and packing 14 of the part or half 2 and the steam can then pass from that part of the steam pipe on the one vehicle through the joint made by the halves 1, 2, to the part of the pipe on the other vehicle.

The hole 11 in the head 4 is shown counterbored or enlarged to accommodate the rubber or other resilient packing 14. The inner end of the packing 14 abuts the shoulder formed by the annular projection 13 which, being of slightly less internal diameter than the internal diameter of the rubber packing 14 or the reduced end of the nipple 5, allows the pressure of the steam or other fluid to be exerted on the inner end of the resilient packing to force it tightly against the shoulder 7 and reduced outer portion of the nipple 5, and so preclude the passage of steam or other fluid between the said parts.

The end of the nipple 5 is preferably rounded, as indicated at 16, to facilitate its entry into the packing 14.

As shown in dotted lines in Fig. 1, a steam trap 17 (which may be of any other preferred construction) is shown screwed into the open lower end of the recess 9. A similar or other suitable steam trap will be provided for the other half 2 of the coupling.

Means are provided for detachably maintaining the halves or parts 1, 2, of the coupling together after they have been placed in engagement as shown in Fig. 2. In Figs. 1, 2, and 3 such means are in the form of a tapered pin 18 which fits a hole 19 formed symmetrically in the opposing faces of the heads 4 of the parts or halves 1, 2. The hole 19 is tapered for a portion of its length, say to a point 20, and then made parallel through to the bottom. The hole 19 passes through the inner side of the larger inner portions of both of the nipples 5, as indicated at 21, so that the pin operates to lock the halves together when it is placed in the position shown in the drawings. The end of the pin 18 is rounded, as indicated at 22, to facilitate its entering the hole 19. It is shown fashioned with a head 23 and flange 24 between which is secured a link 25. The link 25 has attached to it one end of a chain 26 which, at its other end, is attached to a ring 27 loosely arranged around the stem 3. This prevents the possibility of the pin 18 being lost. It is obvious that a pin such as 18 is provided for each half of the coupling, as shown in Fig. 2. The withdrawal of the pin 18 enables the halves 1, 2, to be uncoupled and the joint to be broken.

Figures 4, 5, 6:
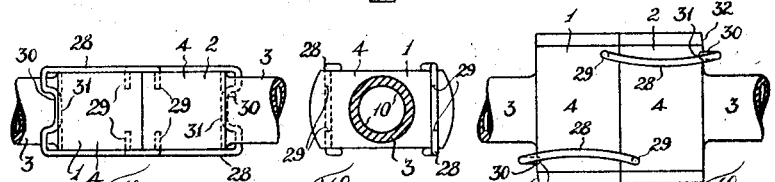
Figs. 4, 5 and 6 are side elevation, end elevation and plan view, respectively, illustrating a modified construction of the means for connecting the parts, elements or halves of the coupling in the engaging or coupled position.

In the modified form of the means illustrated in Figs. 4 to 6 for retaining the halves of the coupling in the coupled position, a spring bale, yoke piece or frame 28 is hingedly attached at 29 to the top and bottom of the head 4 at one side near the front. The bale or yoke member 28 is shaped to embrace the head 4 of the other half of the coupling at the back, at one side of the stem 3, and it is shown provided with a depression 30 which is adapted to be placed in engagement with a recess 31 formed in the back of the head 4. The provision of the two bales or yokes 28 on the halves 1, 2, precludes the possibility of the joint being broken accidentally. As indicated at 32, the side of the head 4, at the back, may be slightly rounded to facilitate the engagement of the spring yoke piece 28 in the recess 31.

What I claim as my invention and desire to protect by Letters Patent is:—

A pipe coupling means including two similar parts having a main passage therein, each part being constructed on the one side with a nipple and on the other side having a hole in which is formed an annular recess, said nipple and hole being in communication with the main passage in the coupling and the nipple being reduced to form a shoulder, a resilient packing ring placed in said recess and projecting into the hole, into which packing the nipple of the other part of the coupling projects, so that the fluid pressure acts directly on the projecting portion of the resilient packing to press it against the shoulder on the nipple and the adjacent end of the recess to make the fluid-tight joint, and means for retaining the parts in the coupled position, as set forth.

In testimony whereof I have signed my name to this specification.

LAUCHLAN McKINNON GLEN.